US012656999B2

(12) United States Patent (10) Patent No.: US 12,656,999 B2

Pedersen et al. (45) Date of Patent: Jun. 16, 2026

(54) HEARING DEVICE WITH MULTI-SOURCE-CONNECTION CONTROL

(71) Applicant: GN Hearing A/S, Ballerup (DK)

(72) Inventors: Thorkild Find Pedersen, Valby (DK); Brian Dam Pedersen, Karlslunde (DK)

(73) Assignee: GN HEARING A/S, Ballerup (DK)

( * ) Notice: Subject to any disclaimer, the term of this patent is extended or adjusted under 35 U.S.C. 154(b) by 282 days.

(21) Appl. No.: 18/322,598

(22) Filed: May 24, 2023

(65) Prior Publication Data

US 2023/0385020 A1 Nov. 30, 2023

(30) Foreign Application Priority Data

May 31, 2022 (DK) ........................... PA 2022 70282

(51) Int. Cl.
*G06F 3/16* (2006.01)
*H04R 1/10* (2026.01)

(52) U.S. Cl.
CPC ........... *G06F 3/165* (2013.01); *H04R 1/1041* (2013.01); *H04R 2420/07* (2013.01)

(58) Field of Classification Search
CPC .............................. H04R 1/1041; G06F 3/165
See application file for complete search history.

(56) References Cited

U.S. PATENT DOCUMENTS

| | | | | |
|---|---|---|---|---|
| 10,985,850 | B1 * | 4/2021 | Ichapurapu | ......... H04W 56/001 |
| 2003/0223604 | A1 | 12/2003 | Nakagawa | |
| 2013/0201927 | A1 * | 8/2013 | Masputra | ............ H04L 47/2441 |
| | | | | 370/329 |
| 2014/0244884 | A1 | 8/2014 | Segev et al. | |

| | | | |
|---|---|---|---|
| 2015/0341724 | A1 | 11/2015 | Pedersen et al. |
| 2021/0152917 | A1 | 5/2021 | Kim et al. |
| 2021/0400411 | A1 | 12/2021 | Lee et al. |

FOREIGN PATENT DOCUMENTS

| | | | | |
|---|---|---|---|---|
| EP | 3007416 A1 * | 4/2016 | .......... | H04M 1/6066 |
| EP | 3007416 B1 * | 3/2020 | ............ | H04W 76/15 |
| EP | 3849223 A1 | 7/2021 | | |
| WO | WO 2014/189619 | 11/2014 | | |
| WO | WO 2020/262927 | 12/2020 | | |
| WO | WO-2020262927 A1 * | 12/2020 | ............. | G06F 3/165 |

OTHER PUBLICATIONS

1st technical examination for Danish patent application No. PA 2022 70282 dated Sep. 2, 2022.
Extended European Search Report for EP Patent Appln. No. 23176468.9 dated Oct. 16, 2023.
Second Exam Report for Danish Patent Appln. No. PA 2022 70282 dated Mar. 31, 2023.

* cited by examiner

*Primary Examiner* — Carolyn R Edwards
*Assistant Examiner* — Dylan Maguire Neece
(74) *Attorney, Agent, or Firm* — Vista IP Law Group, LLP

(57) ABSTRACT

A hearing device and method performed by the hearing device is provided. the hearing device, comprising an interface, a processor, and a memory, wherein the hearing device is configured to obtain connection data indicative of one or more audio sources connected to the hearing device; determine a connection scheme based on the connection data; receive, via the interface, one or more RX events from connected audio sources according to the connection scheme; and transmit, via the interface, one or more TX events to connected audio sources according to the connection scheme.

30 Claims, 3 Drawing Sheets

200

HEARING DEVICE WITH MULTI-SOURCE-CONNECTION CONTROL

RELATED APPLICATION DATA

This application claims priority to, and the benefit of, Danish Patent Application No. PA 2022 70282 filed on May 31, 2022. The entire disclosure of the above application is expressly incorporated by reference herein.

FIELD

The present disclosure relates to a hearing device and related methods including a method of operating a hearing device.

BACKGROUND

In a communication situation, an audio source, such as a hearing device, is connected with multiple audio sources, such as mobile phones, computers, TVs, etc. There is a discrepancy in selecting the audio source for the communication, by the hearing device, when the multiple audio sources try to connect with the hearing device simultaneously. This scenario leads to the situation where the tasks that the hearing device user intended are not performed.

SUMMARY

Accordingly, there is a need for hearing devices and methods with improved connection control.

A hearing device is disclosed, the hearing device comprising an interface, a processor, and a memory, wherein the hearing device is configured to obtain connection data indicative of one or more, such as a plurality of, audio sources connected to the hearing device; determine a connection scheme based on, such as a function of, the connection data; receive, via the interface, one or more reception (RX) events from one or more, such as a plurality of, connected audio sources according to the connection scheme; and optionally transmit, via the interface, one or more transmission (TX) events to one or more, such as a plurality of, connected audio sources according to the connection scheme.

Further, a method of operating a hearing device comprising an interface, a processor, and a memory is disclosed, wherein the method comprises obtaining connection data indicative of one or more, such as a plurality of, audio sources connected to the hearing device; determining a connection scheme based on, such as a function of, the connection data; receiving, via the interface, one or more RX events from one or more, such as a plurality of, connected audio sources according to the connection scheme; and transmitting, via the interface, one or more TX events to one or more, such as a plurality of, connected audio sources according to the connection scheme.

It is an important advantage of the hearing device that the hearing device manages the connection with one or more audio sources, such as a mobile phone, a computer, a TV, a speaker, etc, having different priorities.

The present disclosure allows for improved connection management for handling RX and/or TX events, such as receiving RX events and transmitting TX events, between the connected audio sources and the heating device. Further, discrepancy caused at the hearing device due to multiple audio sources attempting to connect simultaneously is alleviated. This, in turn, helps to improve the battery performance of the hearing device.

Further, it is an advantage of the controlled connection that the risk of connection loss is reduced by efficiently satisfying minimum requirements for maintaining connections while reducing the number of TXs from the hearing device, in turn providing power-efficient connection management in the hearing device.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
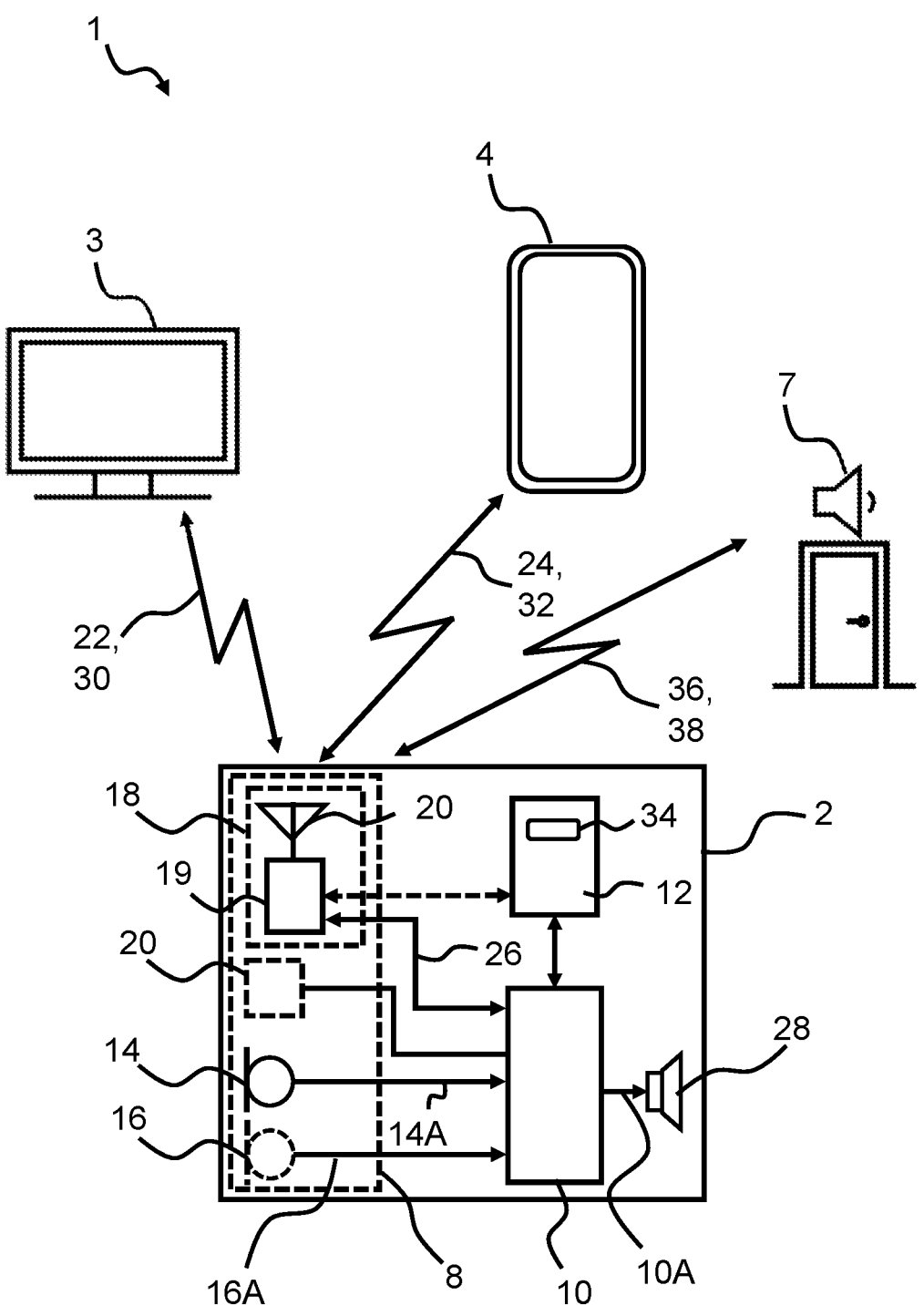
FIG. 1 schematically illustrates an example hearing device according to the disclosure, FIG. 2 schematically illustrates an example operation according to a connection scheme according to the disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

A hearing device is disclosed. The hearing device may be configured to be worn at an ear of a user. The hearing device may be a hearable, such as a device. The hearing device may be a hearing aid, wherein the processor is configured to compensate for a hearing loss of a user.

The hearing device may be of the behind-the-ear (BTE) type, in-the-ear (ITE) type, in-the-canal (ITC) type, receiver-in-canal (RIC) type or receiver-in-the-ear (RITE) type. The hearing aid may be a binaural hearing aid.

The hearing device comprises an interface, a processor, and a memory.

The hearing device/interface may be configured for wireless communication with one or more audio sources. The hearing device/interface may be configured for wireless communication with one or more accessory devices, such as a tablet computer, a laptop computer, a smartphone and/or a smart watch. An accessory device may operate, be, and/or function as an audio source. The hearing device/interface optionally comprises an antenna for converting one or more wireless input signals, e.g. RX events from the one or more connected audio sources. The wireless input signal(s) comprises or are representative of audio data. In other words, the audio data may be encoded in the wireless input signal(s). The wireless input signal(s) may origin from external audio source(s), such as audio sources, e.g. spouse microphone device(s), wireless TV audio transmitter(s), music player(s), car(s), doorbell(s), mobile phone(s), smart watch(es), and wireless audio transmitters(s), such as public wireless audio transmitter(s), e.g. in airports, train stations, stadiums, cinemas, and/or arenas. The wireless input signal(s) may origin from one or more accessory devices.

The hearing device/interface comprises a radio transceiver coupled to the antenna for converting the antenna output signal to audio data. Wireless signals from different external sources may be multiplexed in the radio transceiver to audio data or provided as separate audio data on separate transceiver output terminals of the radio transceiver. The hearing device may comprise a plurality of antennas and/or an antenna may be configured to be operate in one or a plurality of antenna modes.

The hearing device may comprise a set of microphones. The set of microphones may comprise one or more microphones. The set of microphones comprises a first microphone for provision of a first microphone input signal and/or a second microphone for provision of a second microphone input signal. The set of microphones may comprise N microphones for provision of N microphone signals, wherein N is an integer in the range from 1 to 10. In one or more exemplary hearing devices, the number N of microphones is two, three, four, five or more. The set of microphones may comprise a third microphone for provision of a third microphone input signal.

The hearing device comprises a processor for processing input signals, such as pre-processed transceiver input signal and/or pre-processed microphone input signal(s). The processor provides an electrical output signal based on, such as a function of, the input signals to the processor. Input terminal(s) of the processor are optionally connected to respective output terminals of the pre-processing unit. For example, a transceiver input terminal of the processor may be connected to a transceiver output terminal of the pre-processing unit. One or more microphone input terminals of the processor may be connected to respective one or more microphone output terminals of the pre-processing unit.

In one or more example hearing devices, the hearing device comprises an interface, a processor, and a memory, wherein the hearing device is configured to obtain connection data indicative of one or more audio sources connected to the hearing device; determine a connection scheme based on, such as a function of, the connection data; receive, via the interface, one or more RX events from connected audio sources according to the connection scheme, e.g. within a frame having a frame length, such as in the range from 2 ms to 50 ms; and transmit, via the interface, one or more TX events to connected audio sources according to the connection scheme.

In one or more example hearing devices, the hearing device may be configured to receive RX events from one or a plurality of audio sources connected to the hearing device using the interface. An RX event may be a "keep alive message", e.g. according to the Bluetooth protocol. An RX event can be understood as a signal and/or message from an audio source used for maintaining the connection between the hearing device and the respective audio source sending the RX event. In other words, RX events may be seen as part of the control signalling between the hearing device and one or more audio sources connected to the hearing device.

In one or more example hearing devices, the hearing device may be configured to transmit TX events from one or more, such as a plurality of, audio sources connected to the hearing device using the interface. In one or more example hearing devices, the hearing device may be configured to determine, based on, such as a function of, the connection data, using the processor, the connection scheme to control the connection with one or more connected audio sources. In one or more example hearing devices, the hearing device may be configured to store the connection data and/or the connection scheme in the memory.

A TX event may be a "keep alive" acknowledgement or response to, e.g. according to the Bluetooth protocol. A TX event can be understood as a signal and/or message to an audio source used for maintaining the connection between the hearing device and the respective audio source sending a corresponding RX event. In other words, TX events may be seen as part of the control signalling between the hearing device and one or more audio sources connected to the hearing device.

In one or more example hearing devices, the hearing device may be configured to obtain connection data also denoted CD indicative of one or more audio sources, such as a primary audio source also denoted PAS, a secondary audio also denoted SAS and/or a tertiary audio source also denoted TAS, connected to the hearing device. In one or more examples, the connection data is indicative of a plurality of audio sources connected to the hearing device. The hearing device may be configured to obtain connection data using the interface, e.g. during pairing with or connection setup to the audio source(s). The connection data may comprise one or more of primary connection data indicative of the primary audio source and/or a primary connection between the hearing device and the primary audio source; secondary connection data indicative of the secondary audio source and/or a secondary connection between the hearing device and the secondary audio source; and tertiary connection data indicative of the tertiary audio source and/or a tertiary connection between the hearing device and the tertiary audio source.

Connection data indicative of an audio source may comprise one or more source parameters including a first source parameter and optionally a second source parameter. The first source parameter, e.g. a first primary source parameter indicative of the primary audio source, may be a source identifier. The second source parameter, e.g. a second primary source parameter indicative of the primary audio source, may be a latency, a maximum number of re-transmissions or a timeout associated with the respective audio source. For example, a second primary source parameter may be a maximum number of re-transmissions associated with the primary audio source. The second primary source parameter may be a timeout associated with the primary audio source.

In one or more example hearing devices, the primary connection data comprises a first primary source parameter, e.g. a primary source identifier, and optionally a second primary source parameter, e.g. a primary latency, a primary maximum number of re-transmissions or a primary timeout.

In one or more example hearing devices, the secondary connection data comprises a first secondary source parameter, e.g. a secondary source identifier, and optionally a second secondary source parameter, e.g. a secondary latency, a secondary maximum number of re-transmissions or a secondary timeout.

In one or more example hearing devices, the tertiary connection data comprises a first tertiary source parameter, e.g. a tertiary source identifier, and optionally a second tertiary source parameter, e.g. a tertiary latency, a tertiary maximum number of re-transmissions or a tertiary timeout.

In one or more example hearing devices, the connection data may comprise retransmission data indicative of maximum number of re-transmissions or a timeout associated with the one or more audio sources connected to the hearing device. The connection data may comprise bandwidth data indicative of the capabilities, e.g., bandwidth needed for transmission and/or bandwidth needed for reception, associated the one or more audio sources. The connection data may comprise condition data indicative of device condition or status, e.g., enough battery, such as battery level above 50% or not enough battery, such as battery level less than 5%, associated with the one or more audio sources. The connection data may comprise sleep cycle data indicative of sleep cycles associated with the one or more audio sources and/or power data indicative of power saving modes associated with the one or more audio sources. The connection data may comprise position data indicative of relative position, such as the current position, of the one or more audio sources, e.g. for estimating the power and/or frequency needed for transmission.

In one or more example hearing devices, the hearing device may be configured to determine a connection scheme based on, such as a function of, the connection data, such as based on, such as a function of, one or more of sleep cycle data, power data, and position data. The connection scheme may be seen as a connection scheduling scheme to manage one or more events, such as receive, RX, events and/or transmit, TX, events, associated with the one or more audio sources. The connection scheme may comprise one or more frames indicative of time slots. In other words, the connection scheme may comprise a time division scheme with one or more time slots. The one or more time slots may be assigned, by the hearing device, to one or more audio sources for communication, such as to receive RX events and/or transmit TX events, with one or more audio sources. The one or more frames of the connection scheme may have a time duration in the range of milliseconds, such as in the range from 1 ms to 100 ms, or in the range from 2 ms to 50. In one or more examples, the frame length/time duration of frames is in the range from ms to 20 ms, such as 7 ms, 8 ms, 9 ms, 10 ms, 11 ms, 12 ms, 13 ms, 14 ms, or 15 ms. In one or more examples, larger frame length/time duration of frames, such as in the range from 100 ms to 2 s may be used. In other words, each frame in the connection scheme lasts for a certain time period, wherein the time period may be in the order of milliseconds.

In one or more example hearing devices, one or more of a new connection to an additional audio source, a loss of connection to an audio source, a user input, or a control command from an accessory device may trigger determination of the connection scheme. In other words, the hearing device may be configured to detect a new connection and/or a loss of connection, and, in response to a detection of detect a new connection and/or a loss of connection, determine a connection scheme based on the connection data.

In one or more example hearing devices, the one or more frames, such as a first frame, a second frame, a third frame, a fourth frame, a fifth frame, a sixth frame, a seventh frame, an eight frame, and a ninth frame may be indicative of time slots. In one or more example hearing devices, determining the one or more frames may be based on, such as a function of, the connection data.

In one or more example hearing devices, the hearing device may be configured to, e.g. in accordance with or in response to the connection scheme, communicate with a first audio source during the first frame, a second audio source during the second frame, a third audio source during the third frame, a fourth audio source during the fourth frame, a fifth audio source during the fifth frame, a sixth audio source during the sixth frame, a seventh audio source during the seventh frame, an eighth audio source during the eighth frame, and/or a ninth audio source during the ninth frame. In other words, the connection scheme may define a protocol for the hearing device communicating with, such as receiving from and/or transmitting to, respective connected audio sources, i.e. the audio sources connected to the hearing device, for example by selecting the primary audio source for a primary set of frames, and selecting the secondary audio source for a secondary set of frames different from the primary set of frames, i.e. the primary set of frames not having frames in common with the secondary set of frames.

In one or more example hearing devices, the hearing device may be configured to receive, via the interface, one or more RX events from one or more connected audio sources, such as PAS, SAS, TAS. In one or more example hearing devices, the hearing device may be configured to receive, via the interface, by accepting one audio source among one or more audio sources, one or more RX events from one or more of connected audio sources, such as PAS, SAS, and/or TAS. In one or more example hearing devices, the hearing device may communicate, during the one or more frames, with one or more connected audio sources based on, such as a function of, the connection scheme.

In one or more example hearing devices, the hearing device may assign the one or more frames to the one or more audio sources, such as PAS, SAS, and/or TAS, based on, such as a function of, the latency associated with one or more audio sources. By scheduling the frames based on, such as a function of, the audio source latency, the hearing device may keep the connection alive without risk of being it dropped. Thus, connection data associated with an audio source, such as a second source parameter, may comprise an audio source latency associated with the audio source. For example, primary connection data associated with a primary audio source may comprise a primary audio source latency, e.g. as a primary second audio source parameter.

In one or more example hearing devices, one of the connected audio sources may be selected for communication (RX and TX) in a frame. For example, a tertiary audio source connected to the hearing device may be selected as third audio source for the third frame, i.e. the hearing device is configured to, e.g. in accordance with the connection scheme defining/selecting the tertiary audio source for the third frame, communicate (RX and/or TX) with the tertiary audio source in the third frame, e.g. by receiving RX event(s) and/or transmitting TX event(s) to the tertiary audio source.

In one or more example hearing devices, the hearing device may be configured to, e.g. in accordance with the connection scheme, refrain from communicating, such as receiving RX events and/or transmitting TX events, with one or more of the connected audio sources during one or more frames. In one or more example hearing devices, the hearing device may be configured to refrain from communicating with the connected devices based on the latencies associated with the connected audio sources. Thereby, a power efficient maintenance of connections is provided.

In one or more example hearing devices, the hearing device may obtain connection data indicative of PAS, SAS, and/or TAS connected to the hearing device. The connection data may comprise information or data, such as device latency, sleep cycle, battery level, communication type, bandwidth for communication associated with the PAS (primary connection data), SAS (secondary connection data), and/or TAS (tertiary connection data). In one or more example hearing devices, the device latency also denoted latency data, such as latency associated with one or more audio sources, may refer to the number of events, such as RX events and/or TX events, that the hearing device may skip on a connection, with the one or more audio sources, without the connection being dropped.

The hearing device may be configured to determine a connection scheme, such as a first connection scheme based on, such as a function of, the connection data. The first connection scheme may comprise scheduled frames, such as time slots, to receive RX events from and/or to transmit TX events to the one or more connected audio sources.

In one or more example hearing devices, the hearing device may receive, during a frame, such as during the first frame, one or more RX events from one or more connected audio sources, e.g. as defined by the connection scheme. The hearing device may address, react to, or process, during the first frame, a single RX event or a plurality of RX events of RX event(s) received from one or more connected audio sources and skip the remaining RX events. For example, during the first frame, the hearing device may receive one or more RX events from PAS, SAS, and/or TAS, and in case the connection scheme defines or selects SAS as the first audio source in the first frame, the hearing device may address, react to, or process, an RX event from SAS and skip the remaining RX events from PAS and TAS.

In one or more example hearing devices, the one or more RX events occur within a short time frame, such as within a few milliseconds, such as within 2 ms, 4 ms, 5 ms, 10 ms, 20 ms, 50 ms, and 100 ms. For example, the hearing device may receive and address, based on, such as a function of, the connection scheme, RX event in the first frame with 10 ms time slot only from SAS. The hearing device may transmit, based on, such as a function of, the connection scheme, TX event only to the SAS within the first frame.

In one or more example hearing devices, to receive the one or more RX events from connected audio sources comprises to select, e.g. from the connected audio sources, a first audio source for a first frame according to the connection scheme; and receive, via the interface, a first RX event from the first audio source in the first frame.

In one or more example hearing devices, to receive the one or more RX events from connected audio sources comprises to select, e.g. from the connected audio sources, an i'th audio source for an i'th frame according to the connection scheme, where i is an index from 1 to M, M being the number of frames in the connection scheme; receive, via the interface, an i'th RX event from the i'th audio source in the i'th frame and/or transmit, via the interface, an i'th TX event to the i'th audio source in the i'th frame.

In one or more example hearing devices, the hearing device may be configured to receive the connection data indicative of one or more audio sources, such as PAS, SAS, and/or TAS connected to the hearing device. In one or more example hearing devices, the hearing device may be configured to determine a connection scheme to control the connection and/or communication with the one or more connected audio source. In one or more example hearing devices, the connection scheme may comprise or define one or more frames, such as the first frame, which may be scheduled for the hearing device to communicate with an audio source of the one or more connected audio sources. In one or more example hearing devices, in the first frame, the hearing device may select an audio source, such as one of PAS, SAS, and TAS. from the connected audio sources as the first audio source based on, as defined by, and/or in accordance with the connection scheme. In one or more example hearing devices, the hearing device may be configured to receive an RX event, such as the first RX event, from the first audio source in the first frame. For example, the hearing device may determine and/or define the connection scheme in a way that the hearing device selects the SAS as the first audio source in the first frame and receives an RX event from the SAS and discard any other RX events received, e.g. from the PAS, and/or the TAS.

In one or more example hearing devices, to transmit the one or more TX events to connected audio sources comprises to transmit, via the interface, a first TX event to the first audio source in the first frame.

In one or more example hearing devices, to receive the one or more RX events from connected audio sources comprises to select, e.g. from the connected audio sources, a second audio source for a second frame according to the connection scheme; and receive, via the interface, a second RX event from the second audio source in the second frame.

In one or more example hearing devices, to transmit the one or more TX events to connected audio sources comprises to transmit, via the interface, a second TX event to the second audio source in the second frame.

In one or more example hearing devices, to receive the one or more RX events from connected audio sources comprises to select, e.g. from the connected audio sources, a third audio source for a third frame according to the connection scheme; and receive, via the interface, a third RX event from the third audio source in the third frame.

In one or more example hearing devices, to transmit the one or more TX events to connected audio sources comprises to transmit, via the interface, a third TX event to the third audio source in the third frame.

In one or more example hearing devices, the hearing device may be configured to receive the connection data indicative of one or more audio sources, such as PAS, SAS, and/or TAS connected to the hearing device. In one or more example hearing devices, the hearing device may be configured to determine a connection scheme to control the connection and/or communication with the one or more connected audio sources. In one or more example hearing devices, the connection scheme may comprise one or more frames, such as the first frame, which may be scheduled for the hearing device to communicate with an audio source. In one or more example hearing devices, in the first frame, the hearing device may select one or more connected audio sources, such as one of the PAS, SAS, and/or TAS, as the first audio source.

In one or more example hearing devices, the hearing device may be configured to receive RX event from the first audio source in the first frame and transmit a TX event, such as a first TX event, to the first audio source in the first frame. For example, the hearing device may determine the connection scheme in a way that the hearing device selects SAS as the first audio source in the first frame, receives RX event from SAS, and discards other RX events received from PAS, and/or TAS. In other words, the hearing device may serve only the SAS in the first frame.

In one or more example hearing devices, the hearing device may receive and/or accept the RX event in the first frame transmit TX event to the SAS in the first frame, e.g. in response to the connection scheme selecting or defining the SAS as the first audio source. In one or more example hearing devices, selecting a connected audio source, such as the PAS, the SAS, and/or the TAS, by the hearing device, as the first audio source in the first frame is based on, such as a function of, the connection scheme. In one or more examples, the hearing device may select the SAS as the first audio source, in the first frame, and may serve the SAS by receiving RX event from SAS and transmitting TX event to SAS.

In one or more example hearing devices, to receive the one or more RX events from connected audio sources comprises to select a second audio source for a second frame according to the connection scheme; and receive, via the interface, a second RX event from the second audio source in the second frame.

In one or more example hearing devices, the hearing device may be configured to receive the connection data indicative of one or more audio sources, such as PAS, SAS, and/or TAS connected to the hearing device. In one or more example hearing devices, the hearing device may be configured to determine a connection scheme to control the connection and/or communication with the one or more connected audio sources. In one or more example hearing devices, the connection scheme may comprise one or more frames, such the first frame, the second frame, and/or the third frame, scheduled for the hearing device to communicate with an audio source.

In one or more example hearing devices, in the first frame, the hearing device may select a connected audio source as the first audio source. In one or more example hearing devices, the hearing device may select, in the first frame, the first audio source based on, such as a function of, the connection scheme.

In one or more example hearing devices, the first audio source may be one of the PAS, SAS, and/or TAS. In one or more example hearing devices, the hearing device may select, in the second frame, a connected audio source as the second audio source. In one or more example hearing devices, the second audio source may be one of the PAS, SAS, and/or TAS.

In one or more example hearing devices, the hearing device may be configured to receive RX event, such as the second RX event, from the second audio source in the second frame. For example, the hearing device may determine the connection scheme in way that the hearing device may select the PAS as the second audio source in the second frame and receive RX event, such as the second RX event, from PAS and discard any other RX events, e.g. received from the SAS, and/or TAS.

In one or more example hearing devices, to transmit the one or more TX events to connected audio sources comprises to transmit, via the interface, a second TX event to the second audio source in the second frame.

In one or more example hearing devices, the hearing device may be configured to receive, based on, such as a function of, the connection scheme, a RX event from the from the first audio source in the first frame and transmit a TX event to the first audio source in the first frame. In one or more example hearing devices, the hearing device may be configured to receive, based on, such as a function of, as defined by, and/or in accordance with, the connection scheme, a RX event, such as the second RX event, from the from the second audio source in the second frame and transmit a TX event, such as the second TX event, to the second audio source in the second frame.

In one or more example hearing devices, the hearing device may determine, based on, such as a function of, the connection data, the connection scheme in a way that the hearing device may select SAS as the first audio source in the first frame and receive RX event from SAS and discard other RX events received from PAS, and/or TAS. In other words, the hearing device may serve only the SAS in the first frame, and may transmit a TX event to the SAS in the first frame, e.g. without transmitting TX event to the other connected audio sources. Thereby, the hearing device may be configured to only serve a single or a reduced number of connected audio sources in each frame. On the other hand, the connection scheme may be determined to satisfy the minimum requirements for maintaining the connections to the audio sources, which in turn allows for a highly power efficient connection handling in the hearing device.

In one or more example hearing devices, the hearing device may determine, based on, such as a function of, the connection scheme in a way that the hearing device may select the PAS as the second audio source in the second frame and receive RX event from the PAS and discard other RX events received from the SAS, and/or TAS. In other words, the hearing device may serve only the SAS in the second frame, and may transmit a TX event to the PAS in the second frame, e.g. without transmitting TX event to the other connected audio sources.

In one or more example hearing devices, the connection data comprises a primary latency of a primary audio source connected to the hearing device, and wherein to determine a connection scheme is based on, such as a function of, the primary latency. In one or more example hearing devices, the hearing device may be configured to determine the connection scheme based on, such as a function of, the connection data indicative of the one or more audio sources, such as the PAS, the SAS and/or TAS, connected to the hearing device. In one or more example hearing devices, the connection data may comprise latency information indicative of latencies, such as a primary latency associated with the PAS. In one or more example hearing devices, the hearing device may be configured to determine the connection scheme based on, such as a function of, the primary latency associated with the PAS. In other words, the scheduling of one or more frame frames in the connection scheme may be based on, such as a function of, the primary latency associated with the PAS.

In one or more example hearing devices, the connection data comprises a secondary latency of a secondary audio source connected to the hearing device, and wherein to determine a connection scheme is based on, such as a function of, the secondary latency.

In one or more example hearing devices, the hearing device may be configured to determine the connection scheme based on, such as a function of, the connection data indicative of the one or more audio sources, such as the PAS, the SAS and/or TAS, connected to the hearing device. In one or more example hearing devices, the connection data may comprise latency information or latency data indicative of latencies, such as a primary latency associated with the PAS, a secondary latency associated with the SAS, and optionally a tertiary latency associated with the TAS. In one or more example hearing devices, the hearing device may be configured to determine the connection scheme based on, such as a function of, the latency data, such as the secondary latency associated with the SAS and/or the tertiary latency associated with the TAS. In other words, scheduling of RX and TX in one or more frames in the connection scheme may be based on, such as a function of, the latency data, e.g. secondary latency associated with the SAS and/or the tertiary latency associated with the TAS. In one or more example hearing devices, the hearing device may be configured to determine the connection scheme based on, such as a function of, the secondary latency of the SAS and the primary latency of the PAS. In one or more example hearing devices, the hearing device may be configured to determine the connection scheme based on, such as a function of, a latency associated with each connected audio source.

In one or more example hearing devices, the connection data comprises a tertiary latency of a tertiary audio source connected to the hearing device, and wherein to determine a connection scheme is based on, such as a function of, the tertiary latency. In one or more example hearing devices, the hearing device may be configured to determine the connection scheme based on, such as a function of, the tertiary latency associated with the TAS. In other words, scheduling of RX and TX in one or more frames in the connection scheme may be based on, such as a function of, the latency data, e.g. the tertiary latency associated with the TAS. In one or more example hearing devices, the hearing device may be configured to determine the connection scheme based on, such as a function of, the tertiary latency of the TAS, the secondary latency of the SAS, and the primary latency of the PAS.

In one or more example hearing devices, the connection scheme is determined such that at least the primary latency is satisfied. In one or more example hearing devices, the connection scheme is determined such that at least two or at least three latencies, timeout, and/or maximum number of re-transmissions are satisfied. In other words, the connection scheme may be determined such that the minimum requirements for maintaining the connection to one or more, such as a plurality or all of the primary audio source, the secondary audio sources, and the tertiary audio source are satisfied.

In one or more example hearing devices, to receive the one or more RX events from connected audio sources comprises to select a third audio source for a third frame according to the connection scheme; and receive, via the interface, a third RX event from the third audio source in the third frame.

In one or more example hearing devices, the hearing device may be configured to receive the connection data indicative of one or more audio sources, such as the PAS, SAS, and/or TAS connected to the hearing device. In one or more example hearing devices, the hearing device may be configured to determine a connection scheme to control the connection and/or communication with the one or more connected audio sources. In one or more example hearing devices, the connection scheme may comprise one or more frames, such as the first frame, the second frame, and/or the third frame, scheduled for the hearing device to communicate with a connected audio source.

In one or more example hearing devices, the first audio source may be one of the PAS, SAS, and/or TAS. In one or more example hearing devices, the second audio source may be one of the PAS, SAS, and/or TAS. In one or more example hearing devices, the third audio source may be one of the PAS, SAS, and/or TAS.

In one or more example hearing devices, the hearing device may be configured to receive RX event, such as the third RX event, from the third audio source in the third frame. For example, the hearing device may determine the connection scheme in a way that the hearing device may select the TAS as the third audio source in the frame and receive an RX event, such as the third RX event, from the TAS and discard any other RX events received from the PAS, and/or SAS.

In one or more example hearing devices, to transmit the one or more TX events to connected audio sources comprises to transmit, via the interface, a third TX event to the third audio source in the third frame.

In one or more example hearing devices, the hearing device may be configured to receive the connection data indicative of one or more audio sources, such as the PAS, the SAS, and/or the TAS connected to the hearing device. In one or more example hearing devices, the hearing device may be configured to determine a connection scheme to control the connection and/or communication with the one or more connected audio sources. In one or more example hearing devices, the connection scheme may comprise one or more frames, such the first frame, the second frame and/or the third frame, which may be scheduled for the hearing device to communicate with connected audio source(s). In one or more example hearing devices, the hearing device, in the first frame, may select a connected audio source, such as one of the PAS, SAS, and/or TAS, as the first audio source in accordance with or as defined by the connection scheme. For example, the hearing device may select the SAS as the first audio source in the first frame. In one or more example hearing devices, the hearing device, in the second frame, may select a connected audio source, such as one of the PAS, SAS, and/or TAS, as the second audio source. For example, the hearing device may select the PAS as the second audio source in the second frame. In one or more example hearing devices, the hearing device, in the third frame, may select a connected audio source, such as one of the PAS, SAS, and/or TAS, as the third audio source. For example, the hearing device may select the TAS as the third audio source in the third frame.

In one or more example hearing devices, the hearing device may be configured to receive, based on, such as a function of, the connection scheme, a RX event from the first audio source in the first frame and/or transmit a TX event to the first audio source in the first frame. In one or more example hearing devices, the hearing device may be configured to receive, based on, such as a function of, the connection scheme, a RX event from the from the second audio source in the second frame and/or transmit a TX event to the second audio source in the second frame. In one or more example hearing devices, the hearing device may be configured to receive, based on, such as a function of, the connection scheme, the RX event, such as the third RX event, from the third audio source in the third frame and/or transmit the TX event, such as the third TX event, to the third audio source in the third frame.

In one or more example hearing devices, RX events are received on or via a control channel and/or TX events are transmitted on or via a control channel.

In one or more example hearing device, the hearing device is configured to determine whether a transmit skip criterion based on, such as a function of, the connection scheme is satisfied for a frame; and in accordance with a determination that the transmit skip criterion is satisfied, skip to transmit, such as not to transmit, a TX event in the frame. In other words, the connection scheme may define that no TX event is transmitted in one or more frames, further contributing to reducing power.

In one or more example hearing devices, the hearing device may be configured to receive connection data indicative of one or more audio sources connected to the hearing device. The connection data may comprise information or device property data indicative of device properties associated with the one or more connected audio sources, such as the PAS, SAS, and/or TAS. The device properties may be indicative of transmission and reception capabilities, latency, battery level, and/or bandwidth associated with one or more connected audio sources.

In one or more example hearing devices, the hearing device may be configured to determine a transmit skip criterion based on, such as a function of, the connection scheme. In other words, the transmit skip criterion may be dynamically changed or adapted in dependence of the connection scheme.

In one or more example hearing devices, the transmit skip criterion may be satisfied when the selected audio source, in the frame, may not require a TX event from the hearing device. In this scenario, the hearing device may select the RX event from the audio source by discarding RX events from the other audio sources, and skip transmitting a TX event to the audio source in the frame.

In one or more example hearing devices, the connection scheme may comprise, define, or cover, one or more frames. For example, in the second frame, the hearing device may be configured to consider a RX event from the connected PAS and discard other RX events from the SAS, and/or TAS. Further, the hearing device, in the second frame, may skip transmitting, based on, such as a function of, the connection scheme, a TX event to the connected PAS.

In one or more example hearing devices, the hearing device is configured to determine whether a receive skip criterion based on, such as a function of, the connection scheme is satisfied for a frame; and in accordance with a determination that the receive skip criterion is satisfied, skip to receive, such as not to receive, an RX event in the frame. In other words, the connection scheme may define that no RX event is received in one or more frames, further contributing to reducing power.

In one or more example hearing devices, the connection scheme may be configured for three or more connected audio sources, such as the PAS, SAS, and/or TAS, in a way that the first frame may be scheduled for the hearing device to select an RX event from SAS and discard other RX events, the second frame may be scheduled for hearing device to select an RX event from PAS and discard other RX events, the third frame may be scheduled for hearing device to select an RX event from TAS and discard other RX events, the fourth frame in the connection scheme may not be scheduled to perform any action or communication (receiving/transmitting) by the hearing device, e.g. the receive skip criterion and transmit skip criterion are satisfied for the fourth frame. The hearing device may skip receiving RX events from one or more connected audio sources, such as the PAS, the SAS and the TAS in the fourth frame.

In one or more example hearing devices, the receive skip criterion may be based on, such as a function of, the latency associated with one or more connected audio sources. In one or more example scenarios, the connection scheme may have one or more frames that are not scheduled for the hearing device to communicate with the one or more connected audio sources based on, such as a function of, the latencies associated with the one or more connected audio sources.

In one or more example hearing devices, the connection data comprises priorities associated with respective audio sources connected to the hearing device, and wherein to determine the connection scheme comprises to determine the connection scheme based on, such as a function of, the priorities. Accordingly, a primary priority may be associated with and/or assigned to the primary audio source, a secondary priority may be associated with and/or assigned to the secondary audio source, and a tertiary priority may be associated with and/or assigned to the tertiary audio source. In other words, the hearing device may maintain connections based on priorities of connected audio sources, e.g. a connection to a mobile phone may have higher priority than a connection to a doorbell or tv transmitter and thus, the hearing device may be able to, e.g. in a situation where it is not possible to maintain all connections, to maintain the connections of higher importance/priority.

In one or more example hearing devices, the hearing device may be configured to obtain primary connection data indicative of the primary audio source, secondary connection data indicative of the secondary audio source, and tertiary connection data indicative of the tertiary audio source, the primary audio source, the secondary audio source, and the tertiary audio source connected to the hearing device.

For example, among the connected audio sources, such as the PAS, the SAS, and/or the TAS, the SAS may have the highest priority, the PAS may have the second highest priority and the TAS may have the lowest priority. The hearing device may determine the connection scheme in a way that the first frame in the connection scheme is scheduled for the hearing device to select SAS as the first audio source and receive RX event from the SAS. The hearing device may determine the connection scheme in a way that the frames are ordered to serve the connected high priority audio sources first and low priority audio sources after the other priority audio sources are served.

In one or more example hearing devices, to determine the connection scheme comprises to set the connection scheme such that the primary latency of the primary audio source is satisfied. For example, in a scenario where the primary audio source has a primary latency of t_lat_1, the connection scheme is determined, such that the hearing device receives an RX event and transmits a TX event to the primary audio source at least every (t_lat_1/T_frame)'th frame to maintain the connection between the hearing device and the primary audio source. In one or more example hearing devices, the connection scheme is determined, such that the hearing device receives an RX event and transmits a TX event to the primary audio source at least twice every (t_lat_1/T_frame) 'th frame to provide redundancy in the connection maintenance between the hearing device and the primary audio source.

In one or more example hearing devices, to determine the connection scheme comprises to set the connection scheme such that the secondary latency of the secondary audio source is satisfied. In one or more example hearing devices, to determine the connection scheme comprises to set the connection scheme such that the tertiary latency of the tertiary audio source is satisfied.

In one or more example hearing devices, the hearing device may be configured to determine the connection scheme based on, such as a function of, the connection data. In one or more example methods, the connection data may comprise latency information, such as the primary latency, the secondary latency, and/or the tertiary latency associated with the PAS, the SAS, and/or TAS respectively.

In one or more example hearing devices, the hearing device may be configured to determine the connection scheme in a way that the order of frames satisfies the primary latency of the PAS.

In one or more example hearing devices, the hearing device may be configured to determine the connection scheme in a way that the order of frames satisfies the secondary latency of the SAS.

In one or more example hearing devices, the hearing device may be configured to determine the connection scheme in a way that the order of frames satisfies the tertiary latency of the TAS.

In one or more example hearing devices, the hearing device may be configured to determine the connection scheme in a way that the order of frames satisfies the primary latency of the PAS, the secondary latency of the SAS, and/or the tertiary latency of the TAS In one or more example scenarios, three audio sources are connected to the hearing device, e.g. with different latencies. The PAS may have a primary latency t_lat_1 of 30 ms, the SAS may have a secondary latency t_lat_2 of 70 ms, and the TAS may have a tertiary latency t_lat_3 of 1000 ms. Among the connected audio sources, such as the PAS, the SAS, and/or the TAS, the SAS may have the highest priority, the PAS may have the second priority, and the TAS may have the lowest priority.

The hearing device may be configured to determine the connection scheme with one or more frames, each frame having a period length in the range from 2 ms to 100 ms, such as in the range from 5 ms to 20 ms, e.g. 10 ms. In other words, each frame may have a period length also denoted T_frame of 10 ms. In this scenario and with t_lat_1=30 ms, t_lat_2=70 ms, and t_lat_3=1000 ms, the connection scheme may comprise or define that the hearing device receives RX event and transmits TX event from/to the primary audio source at least every $3^{rd}$ frame (t_lat_1/T_frame=3), the hearing device receives RX event and transmits TX event from/to the secondary audio source at least every 7th frame (t_lat_2/T_frame=7), and the hearing device receives RX event and transmits TX event from/to the tertiary audio source at least every 100th frame (t_lat_3/T_frame=100). On the other hand, the connection scheme may comprise or define that the hearing device does not receive RX event and does not transmit TX event from/to any connected audio source e.g. in the fifth frame (F_5) and the sixth frame (F_6), e.g. where the hearing device serves (RX from and TX to) the primary audio source at least in frames F_1, F_4, F_7, F_10, F_13, _F_16, F_19, F_22 . . . , the hearing device serves the secondary audio source at least in frames F_2, F_9, F_15, F_21 (F_16 and F_22 are blocked by PAS), and the hearing device serves the tertiary audio source at least in frame F_3. The length of the connection scheme, i.e. the number of frames may be based on the latencies of connected audio source, such as the highest latency in this case 1000 ms.

It is noted that descriptions and features of hearing device functionality, such as hearing device configured to, also apply to methods and vice versa. For example, a description of a hearing device configured to determine also applies to a method, e.g., performed by a hearing device, wherein the method comprises determining and vice versa.

FIG. 1 shows an exemplary hearing system 1 comprising an example hearing device 2 and one or more audio sources. The hearing system comprises one or more audio sources, such as a primary audio source 3, a secondary audio source 4, and a tertiary audio source 7. The hearing device may be a hearing aid or a hearable, such as a headset or earphones. The hearing device may be configured to be worn at the ear of a user. The primary audio source 3 may be an electronic device, e.g., a TV or TV audio transmitter or audio speaker as illustrated, configured to connect, such as using Bluetooth or BLE, with the hearing device 2. The secondary audio source 4 may be an electronic device, e.g., a mobile phone as illustrated, configured to connect, such as using Bluetooth, with the hearing device 2. The tertiary audio source 7 may be an electronic device, e.g., a doorbell as illustrated, configured to connect, such as using Bluetooth and/or using WiFi, with the hearing device 2.

The primary audio source may be one of a tablet computer, a laptop computer, a personal computer, a microphone device, a wireless TV audio transmitter, a music player, car, a doorbell, a smart watch, and a wireless audio transmitters, such as a public wireless audio transmitter, e.g., in airports, train stations, stadiums, cinemas, arenas, and/or emergency vehicles, such as ambulances, police cars, firetrucks, etc. The primary audio source may be a contralateral hearing device. The secondary audio source may be one of a tablet computer, a laptop computer, a personal computer, a microphone device, a wireless TV audio transmitter, a music player, car, a doorbell, a smart watch, and a wireless audio transmitters, such as a public wireless audio transmitter, e.g., in airports, train stations, stadiums, cinemas, arenas, and/or emergency vehicles, such as ambulances, police cars, firetrucks, etc. The tertiary audio source may be one of a tablet computer, a laptop computer, a personal computer, a microphone device, a wireless TV audio transmitter, a music player, car, a doorbell, a smart watch, and a wireless audio transmitters, such as a public wireless audio transmitter, e.g., in airports, train stations, stadiums, cinemas, arenas, and/or emergency vehicles, such as ambulances, police cars, firetrucks, etc.

The hearing device 2 comprises an interface 8, a processor 10 for provision of an electrical output signal 10A, and a memory 12. The hearing device 2 may be a hearing aid, wherein the processor 10 is configured to compensate for a hearing loss of a user. The interface of hearing device 2 comprises one or more microphones including a first microphone 14 for provision of a first microphone input signal 14A, and optionally a second microphone 16 for provision of a second microphone input signal 16A. One or both of microphones 14, 16 may be omitted.

The interface of hearing device 2 comprises a first wireless communication unit 18 comprising a transceiver 19 and an antenna 20 configured for wireless communication, e.g., with one or more audio sources, such as the primary audio source 3, the secondary audio source 4, and the tertiary audio source 7.

The transceiver 19 is configured to convert wireless input signal(s) including a first wireless input signal 22 received from primary audio source 3 and a second wireless input signal 24 received from secondary audio source 4, a third wireless input signal 36 received from tertiary audio source 3, to one or more transceiver input signals 26. The wireless input signal(s) received from the one or more audio sources may comprise or be seen as one or more RX events received by the hearing device 2.

The processor 10 is configured to process one or more input signals 14A, 16A, 26 and provide an electrical output signal 10A based on, such as a function of, one or more of input signals 14A, 16A, 26. The interface of hearing device 2 comprises a receiver 28 for converting the electrical output signal 10A to an audio output or audio output signal.

The wireless output signal(s) to the one or more audio sources may comprise or be seen as one or more TX events transmitted by the hearing device 2.

The transceiver input signal 26 to the processor 10 may comprise connection data indicative of one or more connected audio sources, such as the primary audio source 3, the secondary audio source 4, and the tertiary audio source 7, connected to the hearing device 2. The connection data comprises information indicative of one or more of latency, maximum number of re-transmissions and a timeout associated with the respective audio source connected to the hearing device 2. The connection data may be received at the hearing device as part of the pairing/forming of connection with the respective audio source. The processor 10 may determine a connection scheme, such as the connection scheme of FIG. 2, based on, such as a function of, the connection data, to control the connections with the connected audio sources 3, 4, 7. The hearing device 2 is configured to determine, using the processor 10, a connection scheme, based on, such as a function of, the latencies, such as the primary latency t_lat_1, secondary latency t_lat_2, and tertiary latency t_lat_3, respectively associated with the primary audio source 3, the secondary audio source 4, and the tertiary audio source 7. The connection scheme comprises and/or defines one or more frames or time slots scheduled for the hearing device 2 to serve and maintain connections to the connected audio sources 3, 4, 7. Based on the connection scheme, the hearing device selects an audio source and considers/receives or listens for the RX event from the selected audio source and optionally discards the remaining RX events.

Further, the hearing device 2 transmits, via the interface and according to the connection scheme, TX events, such as primary TX event(s) 30, secondary TX event(s) 32, and tertiary TX event(s) 38, to the respective connected audio sources 3, 4, 7.

Figure 2:
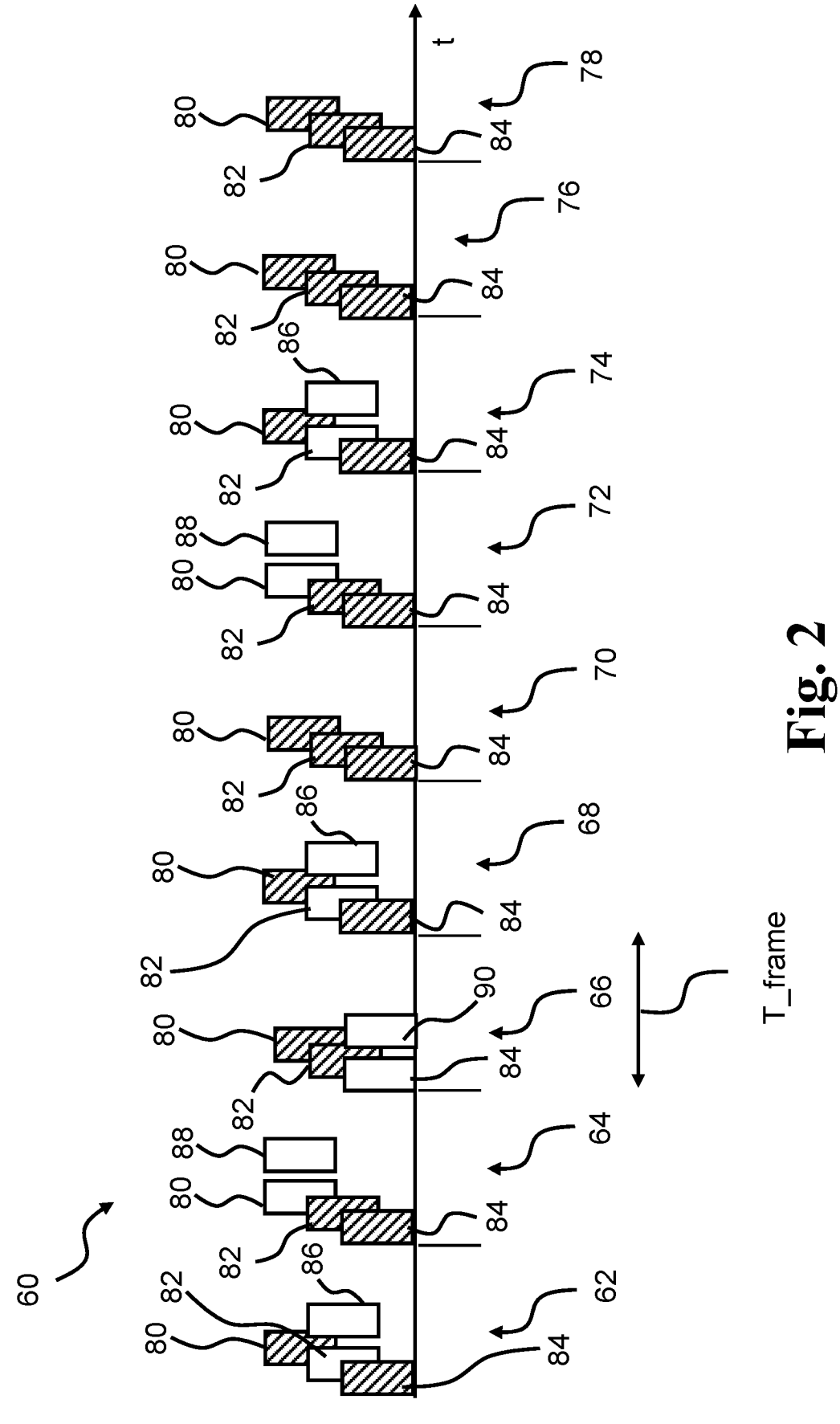

FIG. 2 shows a scenario with hearing device operation according to an exemplary connection scheme 60 determined by a hearing device, such as hearing device of FIG. 1, to control the connection with three connected audio sources including a primary audio source with a primary latency of 50 ms, a secondary audio source with a secondary latency of 30 ms, and a tertiary audio source with a tertiary latency of 90 ms. The connection scheme comprises one or more, such as a plurality of, frames. The frames may be seen as time slots. Each frame has a certain period length T_frame, such as 10 ms as illustrated.

The number of frames of a connection scheme may be determined based on device properties, such as latencies, of the connected audio sources. For example, the number of frames of connection scheme 60 may be based on the highest latency of connected audio sources. For example, the exemplary connection scheme 60 has nine frames based on the latency of the tertiary audio source (t_lat_3/T_frame=90 ms/10 ms=9). Thus, a single RX/TX from/to the tertiary audio source within the connection scheme 60 will maintain the connection to the tertiary audio source.

The connection scheme 60 comprises nine frames including a first frame 62, a second frame 64, a third frame 66, a fourth frame 68, a fifth frame 70, a sixth frame 72, a seventh frame 74, an eight frame 76, a ninth frame 78.

The primary audio source connected to the hearing device transmits primary RX events 80 to the hearing device, the secondary audio source connected to the hearing device transmits secondary RX events 82 to the hearing device, and the tertiary audio source connected to the hearing device transmits tertiary RX events 84 to the hearing device.

In the first frame 62, the hearing device receives the secondary RX event 82 as indicated with solid block and transmits a secondary TX event 86, such as an acknowledgement of reception of the secondary RX event 82, to the secondary audio source as defined by the connection scheme 60. In other words, the secondary RX event 82 is selected as first RX event of the first frame 62 and the secondary TX event 86 is selected as first TX event of the first frame. No TX events are sent to the primary audio source and the tertiary audio source in the first frame. In other words, the hearing device may be configured to transmit a single TX event in the first frame. The hearing device, in the first frame 62, discards or ignores the primary RX event 80 and the tertiary RX event 84.

In the second frame 64, the hearing device receives the primary RX event 80 as indicated with solid block and transmits a primary TX event 88 according to the connection scheme. In other words, the primary RX event 80 is selected as a second RX event of the second frame 64 and the primary TX event 88 is selected as a second TX event of the second frame. No TX events are sent to the secondary audio source and the tertiary audio source in the second frame.

In the third frame 66, the hearing device receives the tertiary RX event 84 as indicated with solid block and transmits a tertiary TX event 90 according to the connection scheme. In other words, the tertiary RX event 84 is selected as third RX event of the third frame 66 and the tertiary TX event 90 is selected as third TX event of the third frame. No TX events are sent to the secondary audio source and the tertiary audio source in the third frame.

In the fourth frame 68, the hearing device receives the secondary RX event 82 as indicated with solid block and transmits a secondary TX event 86 to the secondary audio source as defined by the connection scheme 60 in order to satisfy the secondary latency of 30 ms, i.e. the secondary audio source must receive a TX event at least every 30 ms to maintain the connection to the hearing device. In other words, the secondary RX event 82 is selected as fourth RX event of the fourth frame 68 and the secondary TX event 86 is selected as fourth TX event of the fourth frame. No TX events are sent to the primary audio source and the tertiary audio source in the fourth frame. In other words, the hearing device may be configured to transmit a single TX event in the fourth frame.

In the fifth frame 70, the hearing device does not receive RX events as indicated with hatched boxes/RX events 80, 82, 84. The hearing device does not transmit a TX event in the fifth frame. Since the latencies are 30 ms (secondary audio source), 50 ms (primary audio source) and 90 ms (tertiary audio source) no RX events and TX events have to be exchanged in the fifth frame 70 in order to maintain the connections between the primary, secondary and tertiary audio sources and the hearing device. In other words, the connection schemes defines that the hearing device can skip reception of RX event and transmission of TX event in the fifth frame 70 and still maintain the connections to primary, secondary, and tertiary audio sources.

In the sixth frame 72, the hearing device receives the primary RX event 80 as indicated with solid block and transmits a primary TX event 88 as defined by the connection scheme 60 in order to satisfy the primary latency of 50 ms with transmission at least every $5^{th}$ frame, i.e. the primary audio source must receive a TX event at least every 50 ms to maintain the connection to the hearing device, and since the seventh frame is blocked for the secondary audio source, transmission of primary TX 88 event is moved forward. In other words, the primary RX event 80 is selected as sixth RX event of the sixth frame 72 and the primary TX event 88 is selected as sixth TX event of the sixth frame. No TX events are sent to the secondary audio source and the tertiary audio source in the sixth frame.

In the seventh frame 74, the hearing device receives the secondary RX event 82 as indicated with solid block and transmits a secondary TX event 86 to the secondary audio source as defined by the connection scheme 60 in order to satisfy the secondary latency of 30 ms, i.e. the secondary audio source must receive a TX event at least every 30 ms to maintain the connection to the hearing device. In other words, the secondary RX event 82 is selected as seventh RX event of the seventh frame 74 and the secondary TX event 86 is selected as seventh TX event of the seventh frame. No TX events are sent to the primary audio source and the tertiary audio source in the seventh frame. In other words, the hearing device may be configured to transmit a single TX event in the seventh frame.

In the eighth frame 76 and in the ninth frame 78, the hearing device does not receive RX events as indicated with hatched boxes/RX events 80, 82, 84. The hearing device does not transmit a TX event in the eighth frame 76 and in the ninth frame 78. In other words, the connection schemes defines that the hearing device can skip reception of RX event and transmission of TX event in the eighth frame 76 and in the ninth frame 78 and still maintain the connections to primary, secondary, and tertiary audio sources.

The hearing device is configured to repeat the connection scheme for maintaining connections to the primary, secondary, and tertiary audio sources. The hearing device may be configured to determine the connection scheme e.g. in case one or more additional audio sources are connected to and/or in case one or more of the primary audio source, the secondary audio source, and the tertiary audio source are disconnected from the hearing device.

It is to be noted that the connection scheme may define that one or more of the free frames of the connection scheme, e.g. one or more of frames 70, 76, 78, can be utilized for redundancy in the connection maintenance, e.g. for connected audio sources with high priority. For example, in an example, where the primary audio source has highest priority of audio sources 3, 4, 7, the connection scheme may define the fifth frame to be used to receive secondary RX event 80 and transmit a secondary TX event (not shown) to the second audio source 4.

Figure 3:
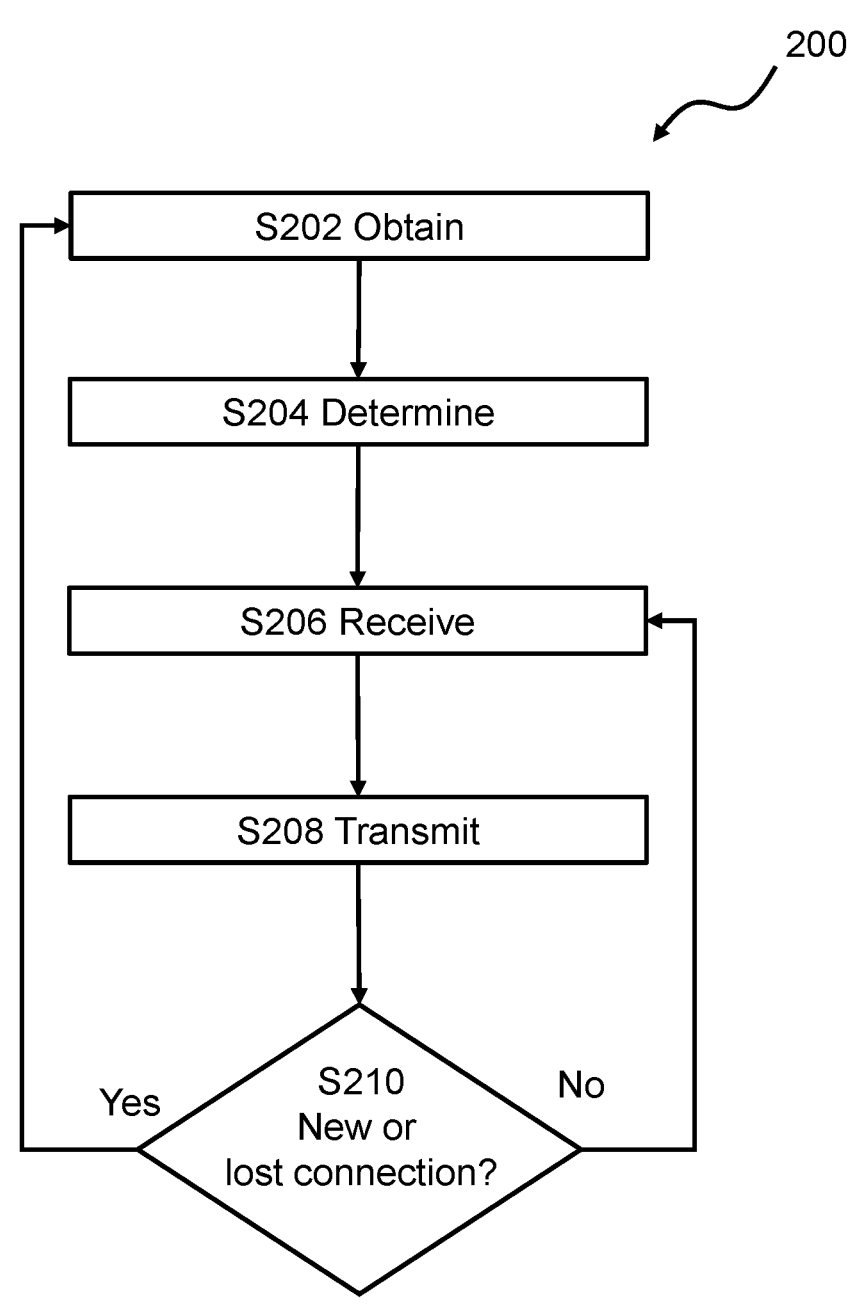
FIG. 3 is a flow diagram of an example method according to the disclosure.

FIG. 3 is a flow diagram of an exemplary method 200 performed by a hearing device comprising an interface, a processor, and a memory. The method 200 comprises obtaining S202 connection data indicative of one or more audio sources connected to the hearing device. The method 200 comprises determining S204 a connection scheme, see e.g. FIG. 2 and associated description, based on, such as a function of, the connection data, e.g. based on one or more source parameters associated with respective connected audio sources, for example including a first source parameter and optionally a second source parameter associated with each of the connected audio sources. The first source parameter, e.g. a first primary source parameter indicative of the primary audio source, may be a source identifier. The second source parameter, e.g. a second primary source parameter indicative of the primary audio source, may be a latency, a maximum number of re-transmissions or a timeout associated with the respective audio source. For example, a second primary source parameter may be a maximum number of re-transmissions associated with the primary audio source. The second primary source parameter may be a timeout associated with the primary audio source. The second primary source parameter may be a latency associated with the primary audio source. The method 200 comprises receiving S206, via the interface, one or more RX events from connected audio sources according to the connection scheme and transmitting S208, via the interface, one or more TX events to connected audio sources according to the connection scheme. Optionally, the method 100 comprises determining S210 whether a new connection is present or a connection to an audio source is lost. In accordance with a determination that a new connection is present or a connection to an audio source is lost, the method optionally proceeds to obtaining S202 connection data. In accordance with a determination that no new connection is present and that no connection to an audio source is lost, i.e. that there are no changes in the connections, the method optionally proceeds to receiving S206 RX events. In other words, the method may comprise repeating receiving RX events and transmitting TX events according to the connection scheme until a change in the number of connected audio sources is detected.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering.

Furthermore, the labelling of a first element does not imply the presence of a second element and vice versa.

It may be appreciated that FIGS. 1-3 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, and systems described herein are described in the general context of method steps processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

LIST OF REFERENCES 1 hearing system
2 hearing device
3 primary audio source
4 secondary audio source
7 tertiary audio source
8 interface
10 processor/processing unit
10A electrical output signal
12 memory
14 first microphone
14A first microphone input signal
16 second microphone
16A second microphone input signal
18 wireless communication unit
19 transceiver
20 antenna
22 first wireless input signal, primary RX event
24 second wireless input signal, secondary RX event
26 transceiver input signal
28 receiver
30 primary TX event
32 secondary TX event
36 third wireless input signal, tertiary RX event
38 tertiary TX event
60 connection scheme
62 first frame
64 second frame
66 third frame
68 fourth frame
70 fifth frame
72 sixth frame
74 seventh frame
76 eighth frame
78 ninth frame
80 primary RX event
82 secondary RX event
84 tertiary RX event
86 secondary TX event
88 primary TX event
90 tertiary TX event
200 method of operating a hearing device
S202 obtaining connection data
S204 determining a connection scheme based on, such as a function of, the connection data
S206 receiving RX events from connected audio sources according to the connection scheme
S208 transmitting TX events to connected audio sources according to the connection scheme
S210 determining whether a new connection is present or a connection to an audio source is lost

The invention claimed is:

1. A hearing device comprising an interface, a processor, and a memory, wherein the hearing device is configured to:
   obtain connection data indicative of one or more audio sources communicatively connected to the hearing device;
   determine a connection scheme based on the connection data;
   receive, via the interface, one or more reception (RX) events from the one or more audio sources;
   transmit, via the interface, one or more transmission (TX) events to the one or more audio sources; and
   wherein the hearing device is configured to schedule the one or more reception events and the one or more transmission events based on the connection scheme to reduce a risk of a connection drop with the one or more audio sources.

2. The hearing device according to claim 1, wherein the one or more RX events comprise a first RX event, wherein the one or more audio sources comprise a first audio source, and wherein the hearing device is configured to receive the one or more RX events from the one or more audio sources by:
   selecting the first audio source for a first frame according to the connection scheme; and
   receiving, via the interface, the first RX event from the first audio source in the first frame.

3. The hearing device according to claim 2, wherein the one or more TX events comprise a first TX event, and wherein the hearing device is configured to transmit the one or more TX events to the one or more audio sources by transmitting, via the interface, the first TX event to the first audio source in the first frame.

4. The hearing device according to claim 2, wherein the one or more RX events comprise a second RX event, wherein the one or more audio sources comprise a second audio source, and wherein the hearing device is configured to receive the one or more RX events from the one or more audio sources by:
   selecting the second audio source for a second frame according to the connection scheme; and
   receiving, via the interface, the second RX event from the second audio source in the second frame.

5. The hearing device according to claim 4, wherein the one or more TX events comprise a first TX event and a second TX event, wherein the hearing device is configured to transmit the one or more TX events to the one or more audio sources by transmitting, via the interface, the first TX event to the first audio source in the first frame.

6. The hearing device according to claim 5, wherein the hearing device is configured to transmit the one or more TX events to the one or more audio sources also by transmitting, via the interface, the second TX event to the second audio source in the second frame.

7. The hearing device according to claim 4, wherein the one or more RX events comprise a third RX event, wherein the one or more audio sources comprise a third audio source, and wherein the hearing device is configured to receive the one or more RX events from the one or more audio sources by:
   selecting the third audio source for a third frame according to the connection scheme; and
   receiving, via the interface, the third RX event from the third audio source in the third frame.

8. The hearing device according to claim 7, wherein the one or more TX events comprise a first TX event, a second TX event, and a third TX event, wherein the hearing device is configured to transmit the one or more TX events to the one or more audio sources by transmitting, via the interface, the first TX event to the first audio source in the first frame.

9. The hearing device according to claim 8, wherein the hearing device is configured to transmit the one or more TX events to the one or more audio sources also by transmitting, via the interface, the second TX event to the second audio source in the second frame.

10. The hearing device according to claim 9, wherein the hearing device is configured to transmit the one or more TX events to the one or more audio sources also by transmitting, via the interface, the third TX event to the third audio source in the third frame.

11. The hearing device according to claim 1, wherein the one or more audio sources comprise a first audio source, wherein the connection data comprises a first latency of the first audio source communicatively connected to the hearing device, and wherein the hearing device is configured to determine the connection scheme based on the first latency.

12. The hearing device according to claim 11, wherein the one or more audio sources comprise a second audio source, wherein the connection data comprises a second latency of the second audio source communicatively connected to the hearing device, and wherein the hearing device is configured to determine the connection scheme based on the second latency.

13. The hearing device according to claim 12, wherein the one or more audio sources comprise a third audio source, wherein the connection data comprises a third latency of the third audio source communicatively connected to the hearing device, and wherein the hearing device is configured to determine the connection scheme based on the third latency.

14. The hearing device according to claim 1, wherein the hearing device is configured to:

determine whether a transmit skip criterion based on the connection scheme is satisfied for a frame; and in accordance with a determination that the transmit skip criterion is satisfied, skip transmitting a TX event in the frame.

15. The hearing device according to claim 1, wherein the hearing device is configured to:

determine whether a receive skip criterion based on the connection scheme is satisfied for a frame; and in accordance with a determination that the receive skip criterion is satisfied, skip receiving an RX event in the frame.

16. The hearing device according to claim 1, wherein the one or more audio sources comprise multiple audio sources, wherein the connection data comprises priorities associated with respective audio sources communicatively connected to the hearing device, and wherein the hearing device is configured to determine the connection scheme based on the priorities.

17. The hearing device according to claim 1, wherein the hearing device is configured to determine the connection scheme based on a latency of one of the one or more audio sources.

18. The hearing device according to claim 17, wherein the hearing device is configured to determine the connection scheme such that the primary latency of the one of the one or more audio sources is satisfied.

19. The hearing device according to claim 1, wherein at least one of the one or more TX events comprises a signal and/or a message.

20. The hearing device according to claim 19, wherein the signal and/or the message is configured to maintain a connection between the hearing device and one of the one or more audio sources.

21. The hearing device according to claim 1, wherein at least one of the one or more TX events comprises a control signal.

22. The hearing device according to claim 1, wherein at least one of the one or more TX events corresponds with at least one of the one or more RX events.

23. The hearing device according to claim 1, wherein at least one of the one or more RX events comprises a signal and/or a message.

24. The hearing device according to claim 23, wherein the signal and/or the message is configured to maintain a connection between the hearing device and one of the one or more audio sources.

25. The hearing device according to claim 1, wherein the connection scheme comprises a frame parameter that is based on a frame period.

26. The hearing device according to claim 25, wherein the frame parameter is a number of frames, and wherein the number of frames is based on the frame period.

27. The hearing device according to claim 26, wherein the number of frames is based on both the frame period and a latency of one of the one or more audio sources.

28. The hearing device according to claim 1, wherein the one or more audio sources comprises multiple audio sources with respective device latencies, and wherein the hearing device is configured to determine the connection scheme based on the respective device latencies of the multiple audio sources.

29. The hearing device according to claim 28, wherein the connection data comprises latency data indicating the respective device latencies of the multiple audio sources.

30. The hearing device according to claim 28, wherein one of the device latencies indicates a number of communication events that the hearing device may skip on a connection with one of the one or more audio sources, without the connection being dropped.

* * * * *